June 1, 1965

H. T. ADKINS ETAL 3,187,188

HIGH SPEED-TURBO-GENERATOR

Filed July 21, 1959

INVENTORS
HAROLD T. ADKINS
RAYMOND I. SCHNEYER
BY

Dale A. Winnie

ATTORNEY

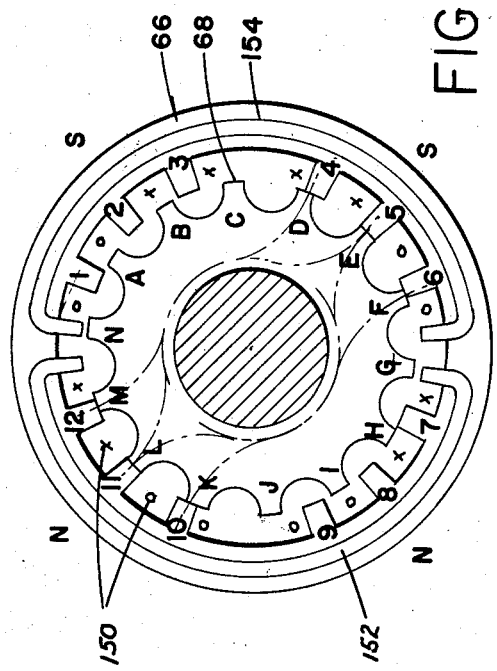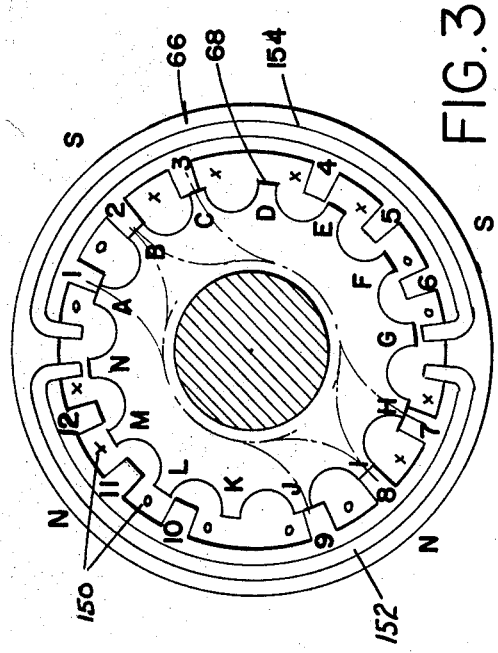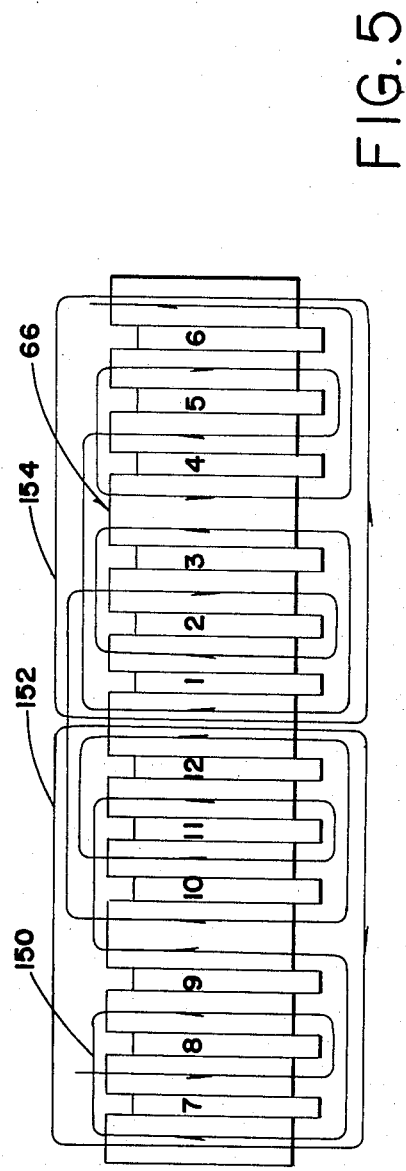

INVENTOR.
HAROLD T. ADKINS
RAYMOND I. SCHNEYER
BY
ATTORNEY

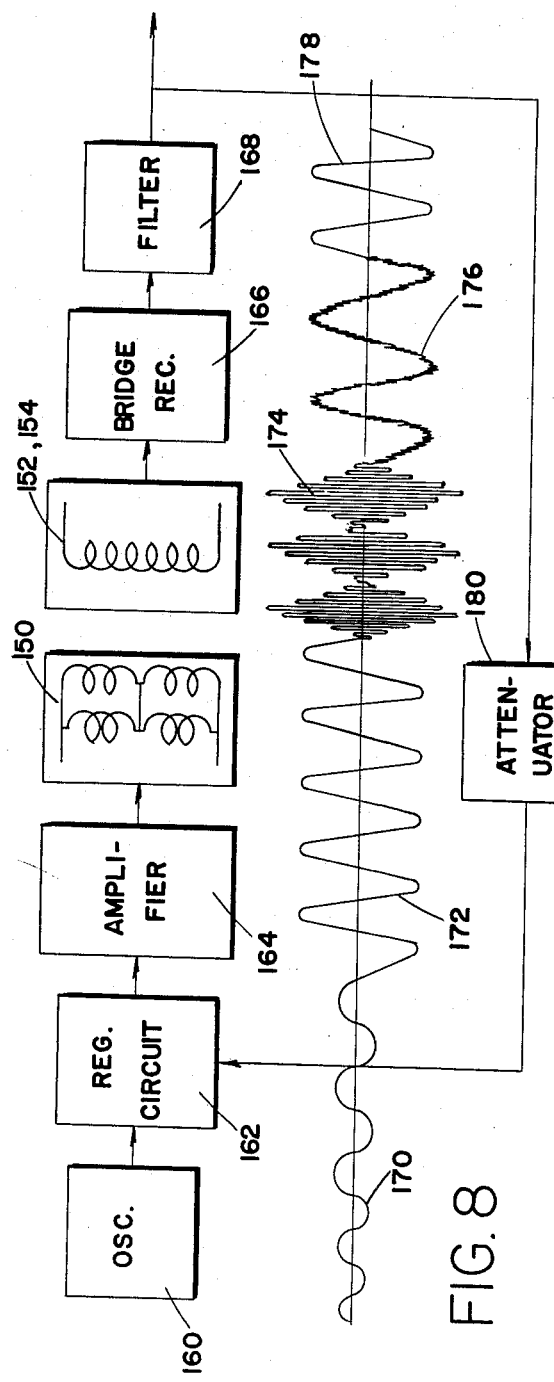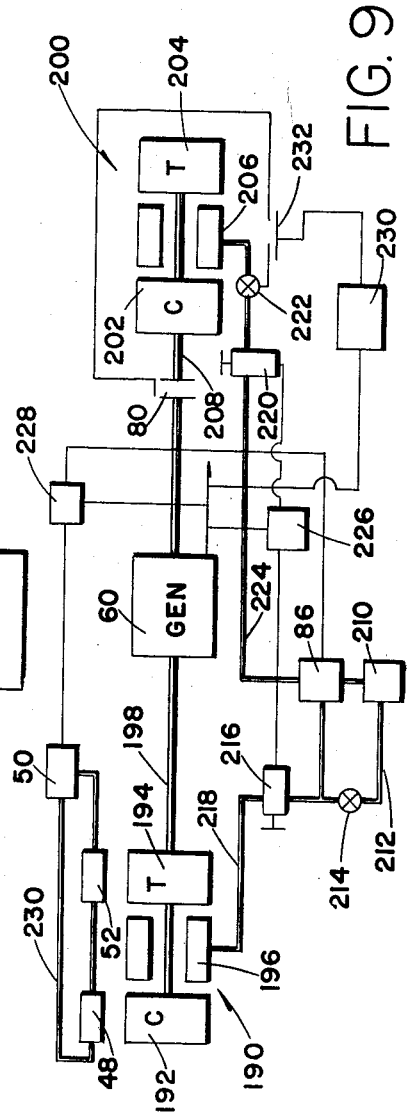

United States Patent Office 3,187,188
Patented June 1, 1965

3,187,188
HIGH SPEED TURBO-GENERATOR
Harold T. Adkins, St. Clair Shores, and Raymond I. Schneyer, Beverly Hills, Mich., assignors to Curtiss-Wright Corporation, Utica, Mich., a corporation of Delaware
Filed July 21, 1959, Ser. No. 828,481
3 Claims. (Cl. 290—4)

This invention relates to electrical generator sets in general, and more particularly to high speed generator sets having accurate frequency control characteristics.

There is a decided need for reliable, lightweight, self-powered generator sets with accurate frequency control characteristics. Gas turbine driven generator sets are known to have an appreciable weight savings advantage over generator sets using reciprocating type engines. However, gas turbine driven generator sets are considered to be handicapped by the weight of the generator itself, by the weight and complexity of the primary and accessory gear boxes, and, as regards frequency control, by the accuracy to which the turbine rotor speed can be controlled. These restrictions stem principally from the normally accepted limitations in speed of 3600 r.p.m. for a two pole, 60 cycle generator set and 24,000 r.p.m. for a 400 cycle generator.

It is an object of this invention to disclose a gas turbine driven generator set which eliminates the need of all gear boxes and enables the generator to be operated at extremely high speeds by making the frequency control independent of the rotor speed. Accordingly, a truly lightweight and portable generator set, of compact design and accurate frequency control, is at last attainable.

It is an object of this invention to disclose an integrated gas turbine and generator unit rather than a turbine generator "set" as presently known.

It is an object of this invention to disclose a single combined turbine and generator rotor operable on a single set of bearings. The gas turbine portion of the rotating assembly, the centrifugal compressor, and the radial inflow turbine are operable essentially as a single part.

It is also an object of this invention to disclose a generator unit operable at high speeds, in the order of 50,000 r.p.m. and above, and on sealed bearings to eliminate the requirement of external lubrication.

Another object of this invention is to disclose a generator having no accessory gear box; which in turn eliminates the need for any lubrication system. All functions normally obtained through the accessory gear box are performed by simpler and more reliable methods.

The gas turbine may be started by operating the generator in reverse, as a motor, by a suitable power source. The fuel pump is initially operated by a small A.C. or D.C. motor from external power and subsequently by the generator itself. The starting ignition system is likewise energized by external power. Where a lubricated bearing system is desirable, a small lube pump may be driven from the same motor that operates the fuel pump.

A further object of this invention is to disclose a compact unit in which the main structure includes the generator stator and the gas turbine housing with an annular combustor used to form the gas discharge tail cone.

No rotor windings are required, and consequently no brushes or slip rings are necessary.

A basic output frequency of 50, 60 or 400 cycles, etc., is obtained by externally oscillating the field of the generator at the desired frequency and by statically rectifying and filtering the resultant output power. Thus the accuracy of the output frequency is dependent only on the accuracy of the external oscillator and is independent of the generator speed. The output voltage, which is dependent upon the speed of the generator, is set conservatively high to allow for transient changes in speed that occur with large load changes and may be adjusted in a voltage regulator to a desired value.

A still further object of this invention is to disclose a means for using a secondary power source during high load periods for a normally partially loaded generator. in conjunction with the accompanying drawings wherein: magnetically locked into the generator and is accelerated to speed by the constantly running turbine as well as its own accelerating torque when the surge requirement is present.

These and other objects and advantages will be more apparent upon a reading of the following specification in conjunction with the accompanying drawing wherein:

FIGURE 3 is a diagrammatic representation of one form of stator windings and rotor suitable for use in the disclosed invention.

FIGURE 4 is similar to FIGURE 3 and shows the rotor in an advanced position.

FIGURE 5 is an open projection of the stator of FIGURES 3 and 4 to show the direction of windings, etc. therein.

FIGURE 8 is a block diagram of the control unit of the high speed generator unit of FIGURE 2 with wave forms shown over respective wave form altering control parts.

FIGURE 9 is a schematic illustration of the high speed generator unit shown by FIGURE 1.

Figure 1:
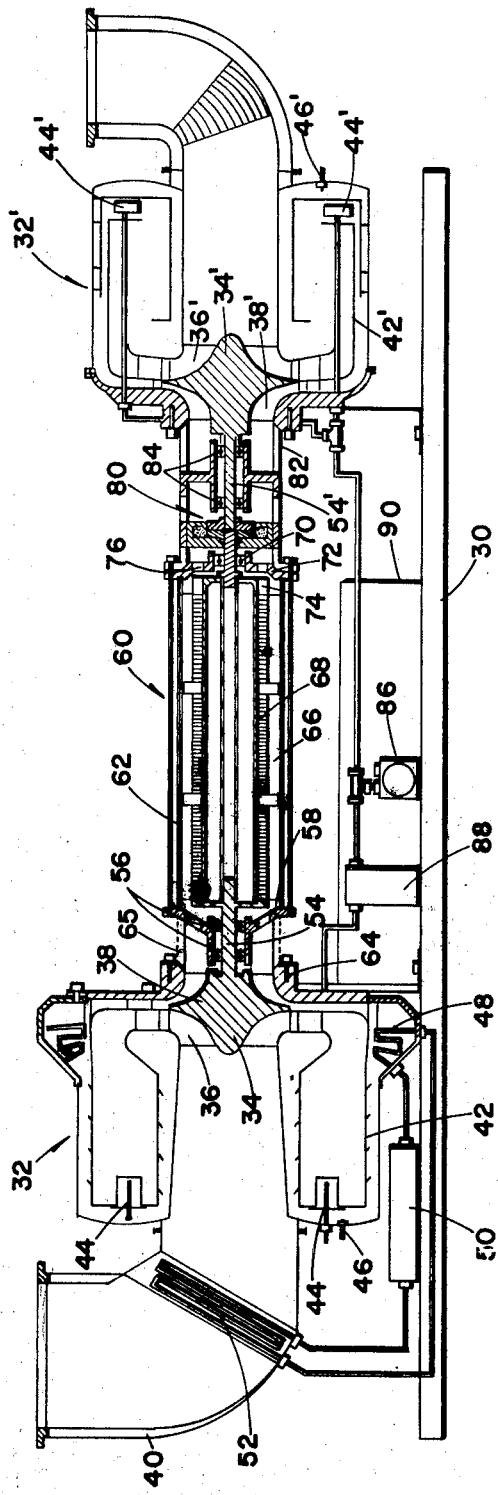
FIGURE 1 is a cross sectional plan view of a three-phase, high speed generator unit including a secondary power source.

Referring to the drawings in further detail:

In FIGURE 1 there is shown a 50,700 r.p.m., 3-phase, 400 cycle generator unit. This particular unit includes a stand 30 on which is mounted an annular combustor chamber 32 near one end thereof. The unitary rotor 34 includes turbine blades 36 on one side and compressor blades 38 on the other side thereof. The compressor face of the rotor 34 is disposed within the inlet throat of the annular combustion chamber 32 and the turbine face is disposed within the outlet therefrom. The inner peripheral walls of the annular combustion chamber serve as an exhaust duct and, in this instance, have a further exhaust duct section 40 secured thereto.

The combustion chamber member 32 is provided with passage defining walls 42, for the separation of inducted air and the combustor exhaust, and includes vaporizers 44 and an ignitor 46. It is also formed to accommodate regenerative heat exchanger coils 48 within the inlet flow passage thereof.

The heat exchanger coils 48 are connected to a heat exchanger pump 50 which is in turn connected to heat exchanger coils 52 in the exhaust duct 40.

The dual functioning unitary rotor 34 includes a rotor stem 54 on the compressor side thereof. The rotor stem 54 is supported in a set of sealed bearings 56 mounted within a spider arm support 58 of the generator 60.

The generator 60 includes a stator housing 62 having one end engaged to the inlet or throat part 64 on the compressor side of the monorotor 34. The housing 62 is formed to include openings 65 near the compressor inlet for the induction of air therethrough and has suitable air screen filtering means therein.

The stator 66 and rotor 68 of the generator 60 will be subsequently described in detail. For the present it will suffice to mention that the generator rotor 68 is fixed for rotation with the monorotor 34 and includes no coil windings. Accordingly, the illustrated embodiment of a 3-phase generator requires no brushes or slip rings.

The generator rotor 68 has its other end journaled within a sealed bearing 70 supported within the end wall 72 of the stator housing 62. The end of the generator rotor 68 is formed to provide a fan 74 and the housing end wall is formed to include openings 76 for the induction of cooling air therethrough. The cooling air is circulated through the generator 60, and past the spider arm support 58 directly into the compressor section of the combustor.

An auxiliary or secondary gas turbine is mounted on the other end of the support stand 30 and is connected to the generator 60 through a magnetic clutch 80. This gas turbine is essentially the same as the primary turbine described. Accordingly, similar parts are designated with the same numerals, but with prime suffix marks for distinction.

The combustor 32′ includes a different arrangement of passage walls 42′, a different form of vaporizer 44′, and no regenerative heat exchanger system; however, there is no material difference in the two turbines as far as this disclosure is concerned.

The secondary turbine is joined to the generator 60 by means of a coupling housing 82. The housing 82 includes sealed bearings 84 receptive to the stem 54′ of the monorotor 34′. The magnetic clutch 80 serves to engage the counterrotating rotor stem 54′ to the generator rotor 68, when called upon to do so.

A fuel pump and motor unit 86 is mounted on the generator stand 30 and is connected by suitable fuel lines to both gas turbines. A speed control unit 88 is connected in the fuel line as will be subsequently described. Other controls which will also be described are housed within a control box 90.

Figure 2:
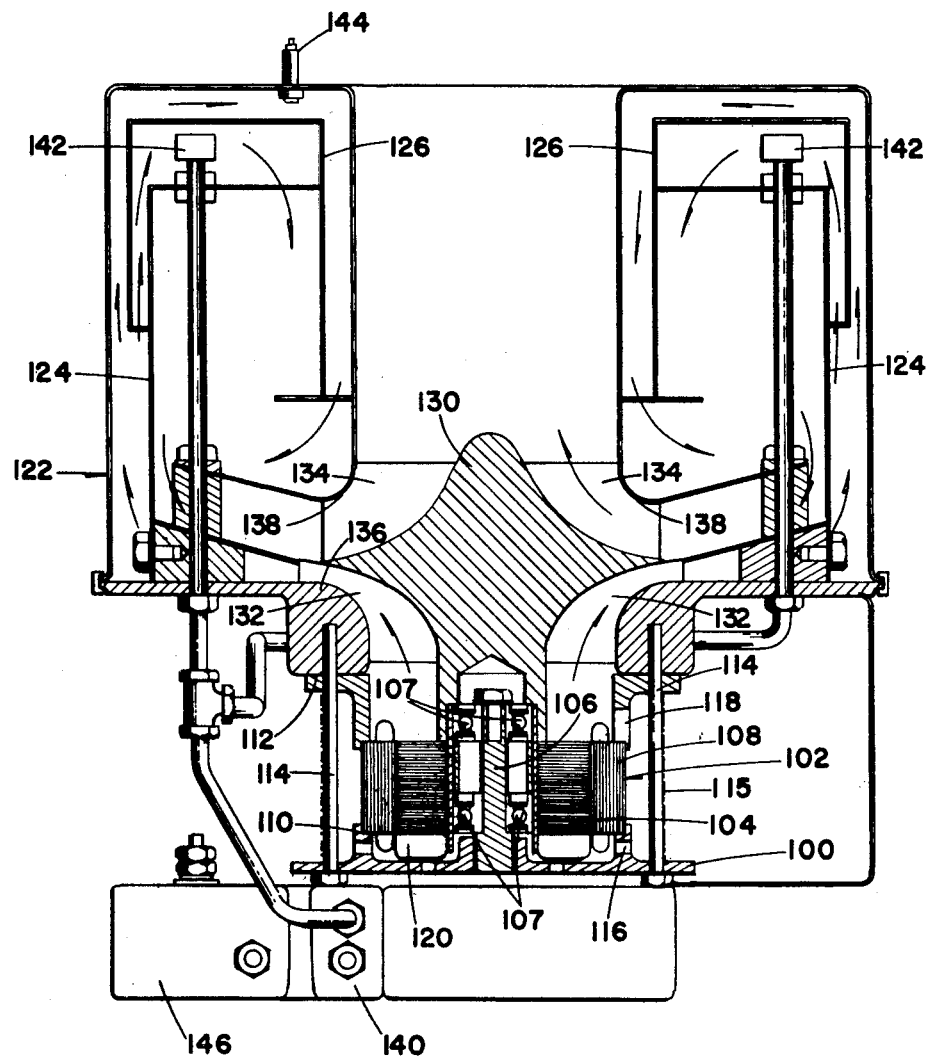
FIGURE 2 is a cross sectional plan view of a single phase, high speed generator unit including a monorotor and other features of this invention.

Departing for the moment from discussion of the three phase generator of FIGURE 1, with its secondary power source, regenerative heat exchanger, etc., reference is made to FIGURE 2 showing a simpler high speed generator including the teachings of this invention. This generator is shown in enlarged scale and will be more thoroughly described. Its actual size is approximately nine inches square at its base by ten inches high. It will produce 10 to 14 kw. at speeds in the order of 70,000 r.p.m.

The generator unit of FIGURE 2 is shown as a single phase generator, though it may readily be adapted to produce a three phase output.

The generator stand 100 is formed to receive and support the generator 102 centrally thereon and with its axis disposed vertically. The rotor 104 of the generator is journaled on a vertically fixed stub shaft 106 on sealed bearings 107. The stator housing 108 of the generator is fixed against rotation between an annular supporting rib 110 formed from the base stand 100 and a flanged sleeve member 112. The sleeve member 112 is engaged to the base stand 100 by the bolts 114 and the whole generator assembly is enclosed within a filter screen 115 around the tie bolts.

The supporting rib 110 of the base stand and the stator retaining sleeve 112 are formed to include air inlet openings 116 and 118 respectively. The generator rotor 104 is formed to provide a fan 120 which draws air in through the openings 116 and circulates it through the generator for cooling purposes. The other air inlets 118 are for the induction of air to the generator driving turbine.

The gas turbine for the generator unit of FIGURE 2 includes an annular combustion chamber member 122 mounted on top of the generator 102. The annular space between the inner and outer walls of the chamber member serve as the combustor space for the turbine. Passage forming walls 124 and 126 are provided within the combustor space to direct incoming air and the combustion exhaust in the manner shown by the flow arrows.

A combination turbine and compressor rotor 130 is shown as formed integral with, or otherwise made a part of, the generator rotor 104. Accordingly, it is rotatably supported by the same sealed bearings 107 as support the generator rotor 104 rotation.

The monorotor 130 is formed to include compressor blades 132 on its underside and turbine blades 134 on its upper or outer face. The compressor blades are formed to complement the compressor section throat 136 which also serves as the end and supporting wall of the combustor 122. The tie bolts 114 are received in threaded engagement with the throat forming member 136 and thereby serve to hold the combustor properly positioned over the generator.

The turbine blades 134 are likewise formed to complement the outlet passage 138 of the combustor and to receive the turbine driving gases therefrom. The inner peripheral space provided by the annular combustion chamber arrangement provides the exhaust passage for the turbine gases.

A fuel pump and motor unit 140 is mounted on the generator stand and is connected by suitable fuel lines to the fuel vaporizers 142 within the combustor. An ignitor 144 is provided, as shown, and suitable control means, which will be described, are housed within the control box 146.

The FIGURES 3–5 show a preferred form of rotor and the associated stator winding for the disclosed high speed generator.

The rotor 68 is formed to include fourteen equally spaced teeth which are identified by the letters A through N. The stator 66 is formed to include twelve teeth in groups of three and separated by a tooth blank. The stator teeth are identified by the numerals 1 through 12. The field windings 150 of the stator 66 are disposed between the stator teeth and include clockwise and counterclockwise windings as shown best by the arrowheads in FIGURE 5. Such windings are also shown by the arrowhead symbols "x" and "o" between the stator teeth in FIGURES 3 and 4. The stator power windings 152 and 154 are shown as each inclusive of one-half of the stator teeth and on opposite sides thereof. Accordingly, the North and South poles are provided as indicated by the symbols N and S outside of the power windings.

With the rotor 68 disposed relative to the stator 66 as shown by FIGURE 3, the rotor teeth A through C and H through J are aligned respectively with the stator teeth 1 through 3 and 7 through 9. Accordingly, the flux lines 156 are as shown. However, upon a half tooth rotation of the rotor the stator teeth D through F and K through M become respectively aligned with the rotor teeth 4 through 6 and 10 through 12. The flux lines 156 are then as shown by FIGURE 4.

Figure 6:
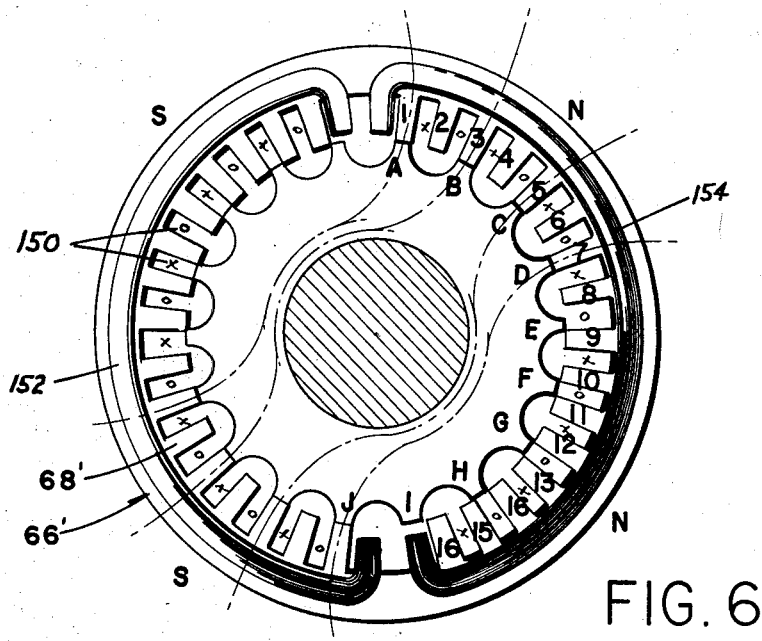
FIGURE 6 is a diagrammatic representation of another form of stator and rotor combination.
Figure 7:
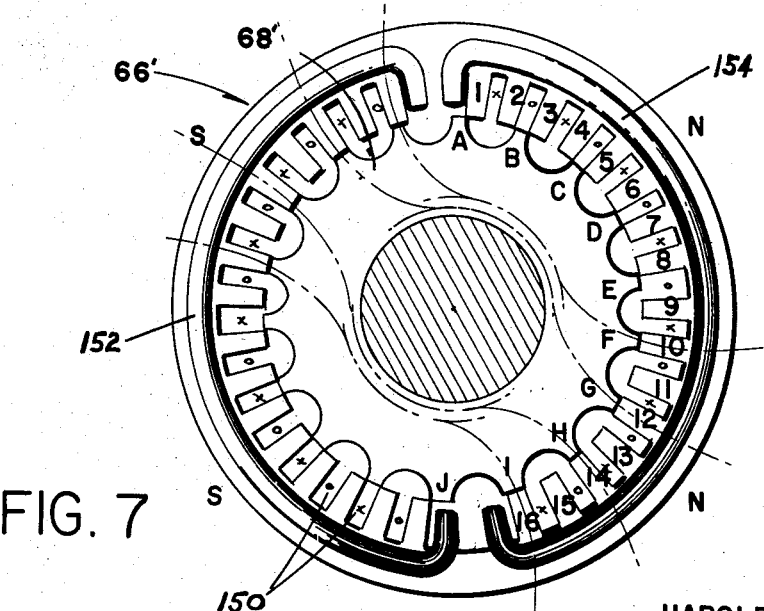
FIGURE 7 is a similar to FIGURE 6 and shows the rotor in an advanced position.

Another form of rotor and related stator windings is shown by FIGURES 6 and 7. In this instance the rotor 68′ has eighteen teeth and the stator 66′ includes thirty-two teeth. The stator teeth are identified alphabetically and the rotor teeth numerically as before. The small "x" and "o" symbols identify the direction of the field windings, which are not otherwise shown. The power windings 152′ and 154′ are shown as in FIGURES 3 and 4. The FIGURES 6 and 7 differ as regards the rotor position and accordingly the disposition of the flux lines 156′.

FIGURE 8 illustrates the major components of the control box 146 used to obtain a single phase output from the generator unit of FIGURE 2. With slight modification, as will be described, the same general arrangement of components is used to provide a three phase output for the generator unit of FIGURE 1 and are disposed within the control box 90 thereof.

An audio oscillator 160 with an external power source is used to provide a desired frequency signal; in the illustrated instance of 400 or 60 cycles per second. The oscillator 160 may be of the tuning fork, vibrating reed, multivibrator, or other type and may be either transistorized, vacuum tube, electro-mechanical, or mechanical in nature. The pulsating voltage output from the oscillator 160 is fed into a circuit 162 for wave form or other regulation where required, and to an amplifier 164 to the field windings 150. If a conventional electronic oscillation generator is used, voltage wave form regulation may not be necessary.

The pulsating input from the oscillator 160 to the field windings 150 causes the flux at the stator pole faces or teeth 1 through 12 to be of variable strength at a frequency prescribed by the oscillator. This in turn results in the flux through the stator and rotor teeth, at a given pole, being varied at the oscillator prescribed frequency.

The rotation of the rotor 68 also causes a variation in the flux at a given pole due to the relatively changing alignment of the stator and rotor teeth. This flux variation produces a voltage in the stator power windings 152 and 154.

Since the frequency of the flux variation due to rotor rotation is greater than the change in flux effected by the oscillator 160, a rapidly varying voltage output is induced in the stator power windings 152 and 154. This induced voltage has a positive and negative amplitude dependent upon the amount of flux available for rotor variation, which is a function of field current, and the flux variation effected by the rotor 68, which is a function of rotor tooth position and speed. The frequency of the power winding output is a function of the number of poles and the rotor speed and is chosen as high as possible, compatible with rectifiers, reactance loss factors, etc.

Inasmuch as the amount of flux available for variation by the rotor 68 is prescribed by the oscillator 160, the voltage output from the stator power windings 152 and 154 has a general wave envelope of the oscillator prescribed frequency. This high frequency variable voltage output is passed through a suitable rectification system 166. The high frequency rectification may be by means of a controlled rectifier, solid state type thyratron, ignitron, gas thyratron, or the like, which rectifies the high frequency oscillations within a low frequency cycle envelope to produce first a positive, low frequency half sine wave swing and then the oscillations of the succeeding envelope to produce a negative half wave.

The output from the rectifier 166 therefore has a wave form of the desired lower frequency but with some high frequency ripple. If the high frequency ripple on the low frequency output wave form is undesirable, a filter 168 may be used to remove the ripple.

If a higher output voltage is available from the generator, a sine wave varying from twice peak voltage to zero may be generated and rectified with ordinary rectifiers. This would result in a Direct Current component equal to half peak voltage. The D.C. bias could be removed in several ways, as by series capacitance or cancellation by opposite phases to obtain an A.C. output.

The general form of the wave output through the different components just described is shown superimposed on the block diagram of FIGURE 8. The low amplitude frequency signal 170 from the oscillator 160 passes through the regulator 162 into the amplifier 164. The amplified signal 172 of desired wave form is fed into the field windings 150 and through high speed rotor rotation causes the high frequency wave form 174 having the prescribed wave form envelope. The high frequency induced voltage after rectification at 166 as described above becomes the low frequency voltage having a wave form 176 with a high frequency ripple. The filter 168 removes the high frequency ripple and provides the desired A.C. output wave 178.

It will be appreciated that a suitable low frequency reference circuit 180 energized by attenuated output power as shown may be interconnected between the final low frequency output and the regulator 162 to obviate the need for the separately energized oscillator 160 once the generator system is in operation.

The circuit for a three phase control unit is substantially the same as that just described except that excitation voltage is tapped off and phase shifted plus or minus 120 degrees to obtain the necessary phase shifts for the proper number of phases in the output. Separate generator segments or sections are used to generate each phase. The feedback for control of the voltage and/or wave form may be on one or all phases. Since this arrangement is readily understood, no illustration or further description is deemed necessary.

It should also be apparent that the disclosed generator may be used as a starter motor for the turbine. Since there are numerous ways in the prior art of using an induction generator as an induction motor for starting purposes, no illustration or further discussion seems required.

In passing, it should be noted that a system for controlling the output of a high speed, high frequency, A.C. generator could be built using a variable reluctance or resistance, thyratron conduction region, magnetic amplifier, saturable reactor or the like. This parallels the disclosed embodiment as regards the variable reluctance between stator and rotor teeth. In such installations a permanent magnet field, slip ring excited field, or induction field generator could be used.

Oscillating the field windings current and cutting the output conductors (the stator power windings) by the varying flux to obtain low frequency modulation, involves hysteresis effect, so that the field structure is preferably laminated for low loss variations at the desired output frequency. Accordingly, the proposed generator differs structurally from normal high frequency generators in having a laminated field as well as laminated stator and rotor iron.

Referring now to FIGURE 9, which is a diagrammatic representation of the generator set of FIGURE 1:

The primary turbine unit 190 is shown as including the compressor 192, the turbine 194, and the annular combustor 196. The compressor and turbine are interconnected by the shaft 198 which drives the generator 60 and extends therebeyond.

The secondary turbine 200 includes a compressor 202, a turbine 204 and an annular combustor 206. Its shaft 208 interconnects the compressor and turbine parts and terminates at the magnetic clutch 80. The magnetic clutch device 80 is intended to engage together the different turbine driven shafts 198 and 208.

The fuel system for the combustors 196 and 206 includes a fuel pump and motor 86. The fuel pump is connected to a fuel tank 210 by fluid lines 212 which include a bypass valve 214. A servo valve 216 is provided within the fuel supply line 218 to the combustor 196 and another servo valve 220 and relay operated shut-off valve 222 is provided in a separate fuel supply line 224 to the other combustor 206.

The servo valves 216 and 220 are both electrically connected to a speed sensing control device 226 which is itself operatively connected to the generator 60. The speed sensing device 226 is an analog digital computor or the like receptive of a high frequency signal from the generator as an indication of turbine speed and fuel requirements.

The fuel pump motor of the pump and motor combination 86 is a D.C. motor which is connected to a battery source or, as shown, to the output side of the generator 60 via a rectifier 228.

The heat exchanger pump 50 is connected within a sealed-in fluid system 230 to heat exchanger coils 48 disposed in the compressor discharge (cold side) and coils 52 in the turbine exhaust (hot side). The pump motor is a D.C. motor and is connected to the rectifier 228 at the output side of the generator 60. The heat exchanger enables improved specific fuel consumption during standby operations.

For additional power in driving the generator 60, as during track, reload, and recharging periods, the turbine 200 is readily available. A current sensing device 234 is connected to the modulated generator output and to a relay 232 adapted to close the circuit to the magnetic clutch 80. Only about a two-second warning is necessary to have the gas turbine 200 locked to the generator 60 through the magnetic clutch 80.

When the surge requirement is apparent the sensing device 234 operates valve 222 through relay 232, the booster turbine is accelerated to speed, and the clutch 80 closes to enable the constantly running turbine to assist in the acceleration to the required speed. For short time fire and reload power, the booster turbine 200 enables overloads of 50%.

*Operation and performance*

The generator unit of FIGURES 1 and 9 will be generally discussed as regards operation and performance. However, it will be appreciated that much of the discussion pertains equally as well to the smaller generator unit of FIGURE 2.

The primary turbine 190 is started by operating the generator in reverse as a motor from a suitable electrical power source. The fuel pump motor and ignition system are operated initially from the same starting power source until the generator takes over.

The entry of air into the compressor section 192 is accomplished through openings 65 in the stator housing 62 next adjacent the turbine. The openings are covered by a protective screen to keep dirt and foreign particles out of the gas turbine air supply. Since the openings enable the entry of air substantially about the entire periphery of the housing, the inlet pressure losses are very low.

The generator cooling air is brought in through openings 76 at the other end of the housing 62 and is discharged directly into the centrifugal compressor inlet.

The generator 60 operates as a high speed, high frequency induction generator without rotor windings, brushes, or slip rings. A basic output frequency of 400 cycles is obtained by external oscillation of the field windings 150 at such frequency, by the oscillator 160, and by statically rectifying and filtering the resulting output power. The accuracy of the output frequency is thus dependent only on the accuracy of the external oscillation and is independent of generator speed. The output frequency is intentionally sufficiently high at the engine running speed to allow for transient changes in speed occasioned by large load changes and is adjustable to a desired value in a static type voltage regulator.

Once the turbine is operating satisfactorily, there is no need for either the external electrical power source or the oscillator 160. The generator unit may provide its own field oscillating signal and by means of the attenuator and frequency reference circuit 180 obviates the continued need for the oscillator 160. The fuel pump unit 86, the heat exchanger pump unit 50, and other accessory units are also operated directly from the generator. Accordingly, no accessory gear box is required.

The disclosed unit is capable of a 400 cycle, 3-phase, 120/208 volt, 45 kw. output. Such power output may be regulated within ±1% from no load to full load at any ambient condition and to within ±1.5% with minor variations in load between no load and full load. On the application or removal of load a recovery to within ±1% is obtainable in less than 100 milliseconds. The frequency remains 400 cycles, ±¼%, under all applications of temperature and/or variation in load.

I claim:
1. A high speed induction generator and gas turbine combination comprising an elongated housing for enclosing the induction generator, one end of said housing terminating in an enlarged portion for enclosing the gas turbine, said gas turbine having a rotor disc with turbine and compressor blades on opposite sides thereof respectively, said enlarged housing portion having a turbine exhaust passage extending axially of the housing and an annular combustion chamber for supplying a pressure medium radially to the turbine blades surrounding said exhaust passage, the compressor side of said rotor disc having radial connections with the aforesaid combustion chamber and being in closely aligned communication with the elongated generator housing for induction of cooling air therethrough, said generator having a toothed rotor and stator with the generator field and power windings both mounted in the stator for generating a high frequency power current according to rotor speed, the turbine and generator rotors being in axially compact alignment and connected for unit rotation.

2. An induction generator and gas turbine combination as specified in claim 1 wherein the elongated housing is compactly disposed between the aforesaid enlarged portion and a second enlarged portion which houses a booster gas turbine unit that can be connected to the generator rotor through a clutch, and generator overload sensing means for controlling operation of the booster and application of said clutch so as to supplement the torque of the first gas turbine upon overload.

3. An induction generator and gas turbine combination as specified in claim 1 having a pair of main bearings mounted in the housing for supporting the complete turbine-generator rotor unit, said bearings being located respectively at opposite ends of the generator rotor.

References Cited by the Examiner
UNITED STATES PATENTS

| | | | |
|---|---|---|---|
| 2,399,905 | 5/46 | Baumann | 310—168 |
| 2,831,156 | 4/58 | Mathews et al. | 322—1 |
| 2,854,617 | 9/58 | Johnson | 322—1 |
| 2,920,211 | 1/60 | Gotoh | 290—30 |
| 2,928,963 | 3/60 | Bertsche et al. | 310—168 |
| 2,941,613 | 6/60 | DiPerna | 290—44 X |
| 2,972,055 | 2/61 | Zaba | 290—52 |

OTHER REFERENCES

Automotive & Aviation Industries, August 1, 1944, pages 26–30, 54, 56, 58, 60 and 64.

ORIS L. RADER, *Primary Examiner.*

MILTON O. HIRSHFIELD, *Examiner.*